Dec. 15, 1953     G. E. REICHERTER     2,662,297
GAUGE FOR TESTING OUT-OF-ROUNDNESS AND
DIAMETERS OF CYLINDRICAL HOLES
Filed Dec. 5, 1950
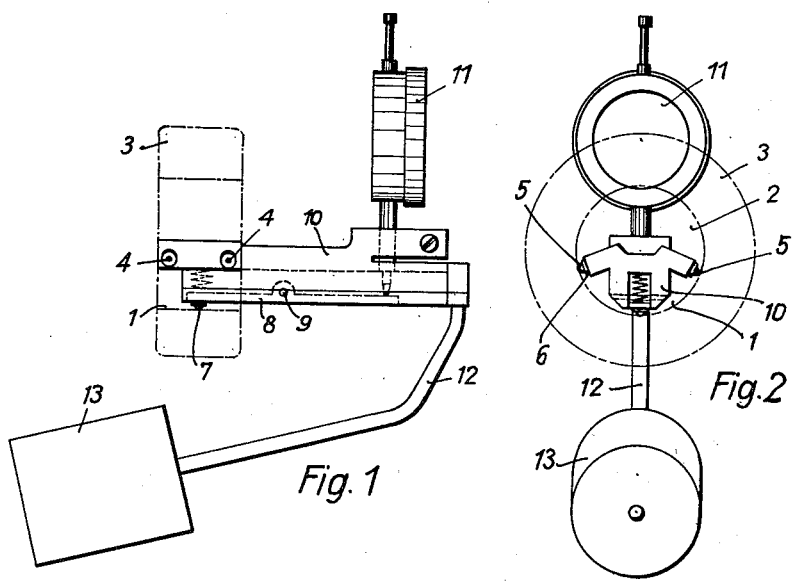
Fig. 1
Fig. 2
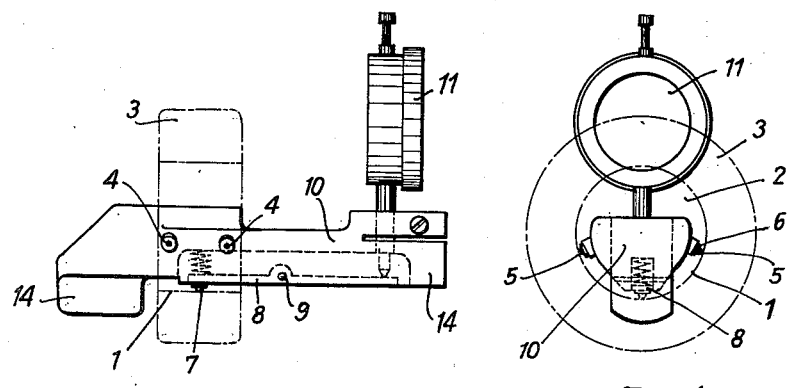
Fig. 3
Fig. 4
INVENTOR:
GEORG E. REICHERTER
BY:

Patented Dec. 15, 1953

2,662,297

UNITED STATES PATENT OFFICE 2,662,297

GAUGE FOR TESTING OUT-OF-ROUNDNESS AND DIAMETERS OF CYLINDRICAL HOLES

Georg E. Reicherter, Esslingen (Neckar), Germany

Application December 5, 1950, Serial No. 199,302

Claims priority, application Switzerland December 5, 1949

6 Claims. (Cl. 33—178)

The invention relates to gauges for testing out-of-roundness and diameters of horizontal cylindrical holes, the gauge lying axially in the hole and resting upon two measuring edges or at least three points of such edges between which the contact point of a dial indicator is arranged. The known gauges of this type are disadvantageous in that they do not steadily lie in the hole being measured but have to be held on this by hand. Generally, in order to find out the exact size of the hole, it is even necessary to impart an oscillating movement to the gauge along the axis of the hole observing the smallest turn of the pointer of the dial indicator during this movement. With these known gauges the result of the measurement is therefore widely dependent on the "feel" of the person applying them which gives rise to considerable measuring errors.

It is an object of the invention to eliminate these drawbacks. In the improved gauge the centre of gravity of the entire gauge is situated below the measuring edges. For testing the out-of-roundness and the diameter of a cylindrical hole the improved gauge needs only to be put into the hole. Here the gauge adjusts automatically after having been set free, remains by itself in the right measuring position and allows the simple reading of the measurement which it constantly indicates.

If the measuring scale of the dial indicator is arranged on a beam outside of the hole and is influenced by the contact point through a double lever, it is desirable to fasten a weight to said beam, the mass of which is situated substantially below the measuring edges and on the side opposite to said measuring scale.

In the following drawings in which two of the possible embodiments of the invention are illustrated Fig. 1 is a side view of a new form of the gauge;

Fig. 2 is a back view of the same gauge;

Fig. 3 is a side view of another form of the gauge;

Fig. 4 is a back view of the second gauge.

The gauge lies on the cylindrical interior wall 1 of the hole 2 in the work 3 to be measured with the four measuring points 4 formed correspondingly by the contacting points of the hemispherical heads 5 of pins 6. Two pairs of contacting points are situated on two straight lines parallel to the axis of the hole 2, each pair of contacting points simulating a measuring edge. Arranged between the contacting points 4 is the contact point 7 of a dial indicator. The contact point 7 is mounted on a double lever 8 pivoted at 9 on a beam 10 which on its one end lying in the hole 2 carries the pins 6. The other end of the beam 10 carries the dial indicator which is connected with the double lever 8 in such a manner that the movements of the contact point 7 are transmitted to it. Mounted on the same end of the beam 10 by means of a connecting rod 12 is the weight 13 which is arranged below the measuring points 4 and on the side opposite to the dial indicator 11 in such a manner that the centre of gravity of the entire gauge is situated below the level determined by the four contacting points. By this the position of the gauge in the hole 2 which it takes up automatically after inserting and in which it remains, becomes positive and absolutely stable. Therefore, the measurement is completely independent of any manipulation of the user.

The gauge shown in Figs. 3 and 4 has the same principal structure as that shown in Figs. 1 and 2. The beam 10 is weighted by tail-ends 14 correspondingly formed in such a manner that the centre of gravity of the entire gauge is situated below the contacting points and that the gauge automatically adjusts itself in the measuring position.

I claim:

1. A gauge for measuring the diameter of a bore having a substantially horizontal axis, comprising, in combination, an elongated beam adapted to extend into the bore to be measured; a plurality of feeler members mounted on a portion of said beam and being distributed on opposite sides of said beam portion and adapted to engage opposite parts of the surface of the bore; a lever turnably connected intermediate its ends to said beam and having one free end portion located opposite said beam portion and an opposite free end portion located distant from said beam portion; an additional feeler member connected to said one free end portion of said lever and being adapted to engage a portion of the bore surface located between the opposite parts of the bore surface; dial means mounted on said beam distant from said portion thereof and engaging said opposite end portion of said lever to be operated by turning movement thereof with respect to said beam; and weight means connected to said beam for locating the center of gravity of the entire gauge below said beam portion, at least a part of said weight means being located on the side of said feeler members opposite from said dial means, so that when the gauge is located within a substantially horizontal bore with said one end portion of said lever and said additional feeler member beneath said beam portion, the gauge will stably rest against the bore surface without being engaged by the operator to give a steady dial indication of the bore size.

2. A gauge for measuring the diameter of a bore having a substantially horizontal axis, comprising, in combination, an elongated beam adapted to extend into the bore to be measured; a plurality of feeler members mounted on a portion of said beam and being distributed on opposite sides of said beam portion and adapted to engage opposite parts of the surface of the bore; a lever turnably connected intermediate its ends to said beam and having one free end portion located opposite said beam portion and an opposite free end portion located distant from said beam portion; an additional feeler member connected to said one free end portion of said lever and being adapted to engage a portion of the bore surface located between the opposite parts of the bore surface; dial means mounted on said beam distant from said portion thereof and engaging said opposite end portion of said lever to be operated by turning movement thereof with respect to said beam; and weight means connected to an end portion of said beam for locating the center of gravity of the entire gauge below said beam portion, at least a part of said weight means being located on the side of said feeler members opposite from said dial means, so that when the gauge is located within a substantially horizontal bore with said one end portion of said lever and said additional feeler member beneath said beam portion, the gauge will stably rest against the bore surface without being engaged by the operator to give a steady dial indication of the bore size.

3. A gauge for measuring the diameter of a bore having a substantially horizontal axis, comprising, in combination, an elongated beam adapted to extend into the bore to be measured; a plurality of feeler members mounted on a portion of said beam and being distributed on opposite sides of said beam portion and adapted to engage opposite parts of the surface of the bore; a lever turnably connected intermediate its ends to said beam and having one free end portion located opposite said beam portion and an opposite free end portion located distant from said beam portion; an additional feeler member connected to said one free end portion of said lever and being adapted to engage a portion of the bore surface located between the opposite parts of the bore surface; dial means mounted on said beam distant from said portion thereof and engaging said opposite end portion of said lever to be operated by turning movement thereof with respect to said beam; and weight means connected to an end portion of said beam located on the side of said dial means opposite from said beam portion for locating the center of gravity of the entire gauge below said beam portion, at least a part of said weight means being located on the side of said feeler members opposite from said dial means, so that when the gauge is located within a substantially horizontal bore with said one end portion of said lever and said additional feeler member beneath said beam portion, the gauge will stably rest against the bore surface without being engaged by the operator to give a steady dial indication of the bore size.

4. A gauge for measuring the diameter of a bore having a substantially horizontal axis, comprising, in combination, an elongated beam adapted to extend into the bore to be measured; a plurality of feeler members mounted on a portion of said beam and being distributed on opposite sides of said beam portion and adapted to engage opposite parts of the surface of the bore; a lever turnably connected intermediate its ends to said beam and having one free end portion located opposite said beam portion and an opposite free end portion located distant from said beam portion; an additional feeler member connected to said one free end portion of said lever and being adapted to engage a portion of the bore surface located between the opposite parts of the bore surface; dial means mounted on said beam distant from said portion thereof and engaging said opposite end portion of said lever to be operated by turning movement thereof with respect to said beam; and weight means connected to an end portion of said beam located on the side of said dial means opposite from said beam portion for locating the center of gravity of the entire gauge below said beam portion so that when the gauge is located within a substantially horizontal bore with said one end portion of said lever and said additional feeler member beneath said beam portion, the gauge will stably rest against the bore surface without being engaged by the operator to give a steady dial indication of the bore size, said weight means being in the form of an elongated bent rod fixed at one end to said end portion of said beam and having a portion located opposite said beam portion on the side of said additional feeler member opposite from said beam portion, and a weight connected to said rod portion and extending beyond an end of said beam on the side of said beam portion opposite from said dial means.

5. A gauge for measuring the diameter of a bore having a substantially horizontal axis, comprising, in combination, an elongated beam adapted to extend into the bore to be measured; a plurality of feeler members mounted on a portion of said beam and being distributed on opposite sides of said beam portion and adapted to engage opposite parts of the surface of the bore; a lever turnably connected intermediate its ends to said beam and having one free end portion located opposite said beam portion and an opposite free end portion located distant from said beam portion; an additional feeler member connected to said one free end portion of said lever and being adapted to engage a portion of the bore surface located between the opposite parts of the bore surface; dial means mounted on said beam distant from said portion thereof and engaging said opposite end portion of said lever to be operated by turning movement thereof with respect to said beam; and weight means connected to an end portion of said beam located on the side of said dial means opposite from said beam portion for locating the center of gravity of the entire gauge below said beam portion so that when the gauge is located within a substantially horizontal bore with said one end portion of said lever and said additional feeler member beneath said beam portion, the gauge will stably rest against the bore surface without being engaged by the operator to give a steady dial indication of the bore size, said weight means being in the form of an elongated bent rod fixed at one end to said end portion of said beam and having a portion located opposite said beam portion on the side of said additional feeler member opposite from said beam portion, and a weight connected to said rod portion and extending beyond an end of said beam on the side of said beam portion opposite from said dial means, said weight and rod defining with said beam a space into which a part of the article being measured may extend.

6. A gauge for measuring the diameter of a bore having a substantially horizontal axis, comprising, in combination, an elongated beam adapted to extend into the bore to be measured; a plurality of feeler members mounted on a portion of said beam and being distributed on opposite sides of said beam portion and adapted to engage opposite parts of the surface of the bore; a lever turnably connected intermediate its ends to said beam and having one free end portion located opposite said beam portion and an opposite free end portion located distant from said beam portion; an additional feeler member connected to said one free end portion of said lever and being adapted to engage a portion of the bore surface located between the opposite parts of the bore surface; dial means mounted on said beam distant from said portion thereof and engaging said opposite end portion of said lever to be operated by turning movement thereof with respect to said beam; and weight means connected to an end portion of said beam on the side of said beam portion opposite from said dial means for locating the center of gravity of the entire gauge below said beam portion so that when the gauge is located within a substantially horizontal bore with said one end portion of said lever and said additional feeler member beneath said beam portion, the gauge will stably rest against the bore surface without being engaged by the operator to give a steady dial indication of the bore size.

GEORG E. REICHERTER.

References Cited in the file of this patent

UNITED STATES PATENTS

| Number | Name | Date |
|---|---|---|
| 1,308,324 | Bellard | July 1, 1919 |
| 1,583,208 | Walker et al. | May 4, 1926 |
| 1,660,986 | Berlowitz | Feb. 28, 1928 |
| 2,124,014 | Street | July 19, 1938 |
| 2,241,287 | Westcott | May 6, 1941 |
| 2,448,106 | Mannerbrink et al. | Aug. 31, 1948 |

FOREIGN PATENTS

| Number | Country | Date |
|---|---|---|
| 801,887 | France | Aug. 20, 1936 |
| 619,331 | Great Britain | Mar. 8, 1949 |